US005794002A

United States Patent [19]
Rosen

[11] Patent Number: 5,794,002
[45] Date of Patent: Aug. 11, 1998

[54] SYSTEM AND TECHNIQUE FOR SYNCHRONIZING DATA TO INSTRUCTIONS IN A REAL TIME COMPUTING APPLICATION

[75] Inventor: Philip G. Rosen, El Segundo, Calif.

[73] Assignee: Raytheon Company, Lexington, Mass.

[21] Appl. No.: 620,624

[22] Filed: Mar. 22, 1996

[51] Int. Cl.[6] .................................................. G06F 3/00
[52] U.S. Cl. .................................... 395/381; 395/551
[58] Field of Search ................................. 395/800, 381, 395/390, 551, 561

[56] References Cited

U.S. PATENT DOCUMENTS

| 4,172,281 | 10/1979 | Gordon | 395/562 |
| 5,042,000 | 8/1991 | Baldwin | 364/726.02 |
| 5,179,530 | 1/1993 | Genusov | 364/736.03 |
| 5,185,871 | 2/1993 | Frey | 395/381 |

*Primary Examiner*—Eric Coleman
*Attorney, Agent, or Firm*—Leonard A. Alkov; Glenn H. Lenzen, Jr.

[57] ABSTRACT

A system and technique for synchronizing data to instructions. The inventive system (10) includes a processor (12), a first memory (14) for providing instructions to the processor (12), a second memory (16) for providing data to the processor (12); and a logic circuit (18, 20), responsive to the second memory (16), for synchronizing the input of instructions from the first memory (14) to the processor (12) based on the rate of flow of data into the second memory (16). In a particular implementation, the second memory (16) is a first-in, first-out (FIFO) memory which provides output data at a first output terminal and an 'almost empty' output signal at a second output terminal thereof. The logic circuit includes an OR gate (18) having a first input terminal connected to the second terminal of the FIFO memory, a second input terminal connected to a source (22) of a clock signal and an output terminal. The logic circuit further includes a register (20) having a first input terminal connected to the first memory (14), an output terminal connected to the processor (12) and a clock input terminal connected to the output terminal of the OR gate (18). The 'almost empty' signal is used to freeze the instruction stream into the processor (12) based on the state of the FIFO (16). The system is flexible and programmable yet synchronization is effected quickly and automatically with simple hardware, minimal memory and no software overhead.

3 Claims, 2 Drawing Sheets

SYSTEM AND TECHNIQUE FOR SYNCHRONIZING DATA TO INSTRUCTIONS IN A REAL TIME COMPUTING APPLICATION

BACKGROUND OF THE INVENTION

1. Field of the Invention

The present invention relates to computing and data processing systems. More specifically, the present invention relates systems and techniques for processing large amounts of data in real time.

2. Description of the Related Art

In many computing and data processing applications, there is a need to process large amounts of data at high speed. In many cases, high speed operation is required in order for the system to operate in real time, with no appreciable delay. One such application is radar using a phased array antenna. In a hostile environment, a jamming signal may be transmitted to impede the performance of the system. Conventionally, the elements of the array are phased to steer a null in the direction of the jammer. This adaptive nulling requires the processing of data received by the array to filter out the jamming signal and identify the direction of its source. The filtering operation is typically performed with an FFT (Fast Fourier Transform) filter. Currently, FFT filters are implemented with either arrays of systolic processors or with a single computing system and two or more large memories with ping-pong the data in a batch mode.

Systolic array processing systems are implemented with a large number of simple processors which typically perform a simple butterfly operation on the incoming data. The system operates in a pipeline fashion. However, systolic array processors are not programmable and therefore lack flexibility. Hence, if other operations are to be performed on the data, the system is of little or no utility.

The batch processors utilize a programmable processor or computer and two or more large memories which store the incoming data for processing. The problem in these real time systems is to queue input data to the instruction stream. Since the real time data comes in at anytime, the difficulty is to synchronize the data to the instruction stream and to keep it synchronized when the input data can not keep up with the instruction stream. In conventional batch processing systems, a significant amount of software overhead is required to synchronize the incoming data stream to the instructions in the data processing system. In addition, these systems require a great deal of memory, have a significant latency, and require a certain amount of dead time to effect a switch.

Thus, a need remains in the art for a high speed data processing system affording a flexible, programmable operation without requiring overhead for the software.

SUMMARY OF THE INVENTION

The need in the art is addressed by the present invention which provides a system and technique for synchronizing data to instructions. The inventive system includes a processor, a first memory for providing instructions to the processor, a second memory for providing data to the processor; and a logic circuit, responsive to the second memory, for synchronizing the input of instructions from the first memory to the processor based on the rate of flow of data into the second memory.

In a particular implementation, the second memory is a first-in, first-out (FIFO) memory which provides output data at a first output terminal and an 'almost empty' output signal at a second output terminal thereof. The logic circuit includes an OR gate having a first input terminal connected to the second terminal of the FIFO memory, a second input terminal connected to a source of a clock signal and an output terminal. The logic circuit further includes a register having a first input terminal connected to the first memory, an output terminal connected to the processor and a clock input terminal connected to the output terminal of the OR gate.

The 'almost empty' signal is used to freeze the instruction stream into the processor based on the state of the FIFO. The system is flexible and programmable yet synchronization is effected quickly and automatically with simple hardware, minimal memory and no software overhead.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
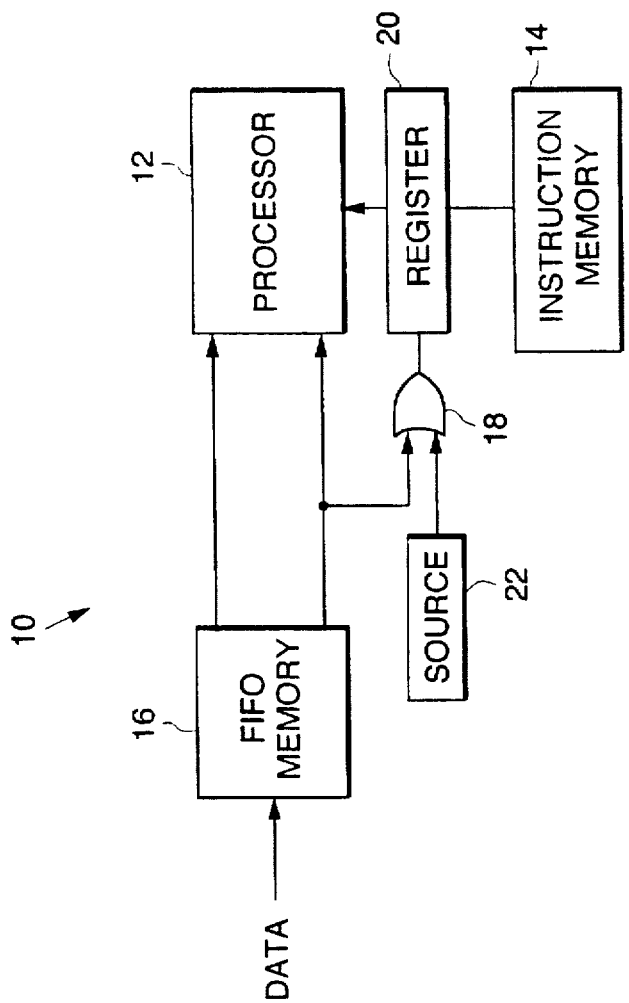
FIG. 1 is a block diagram of the data processing system of the present invention.

FIG. 1 is a block diagram of the data processing system of the present invention. The inventive system 10 includes a processor 12 which may be a computer or other data processing system. The processor 12 receives instructions from an instruction memory 14. Input data is buffered in a first-in, first-out (FIFO) memory 16 from which it is passed on to the processor 12 via a first terminal thereof. A second terminal from the FIFO memory 16 provides an 'almost empty' condition signal at a second output terminal. This signal is known in the art as a 'SILO' signal. FIFO memories which provide a SILO signal may be purchased from Cypress Semiconductor Inc. of San Jose, Calif. as a FIFO With Programmable Flags.

In accordance with the present teachings, the 'almost empty' signal provides a signal which freezes the flow of instructions to the processor 12 from the instruction memory 14. This is effected via a logic circuit which includes an OR gate 18 and a register 20.

A first input to the OR gate 18 is provided by the SILO signal from the FIFO. This signal is also input directly to the processor 12. A second input to the OR gate 18 is provided by a clock 22. The output of the OR gate 18 is input to the clock input terminal of the register 20. Thus, when the SILO signal is high, the register 20 is unable to receive a clock input and therefore unable to provide instructions to the processor 12 from the instruction memory 14. This allows for data to be synchronized to instructions without software intervention.

Figure 2:
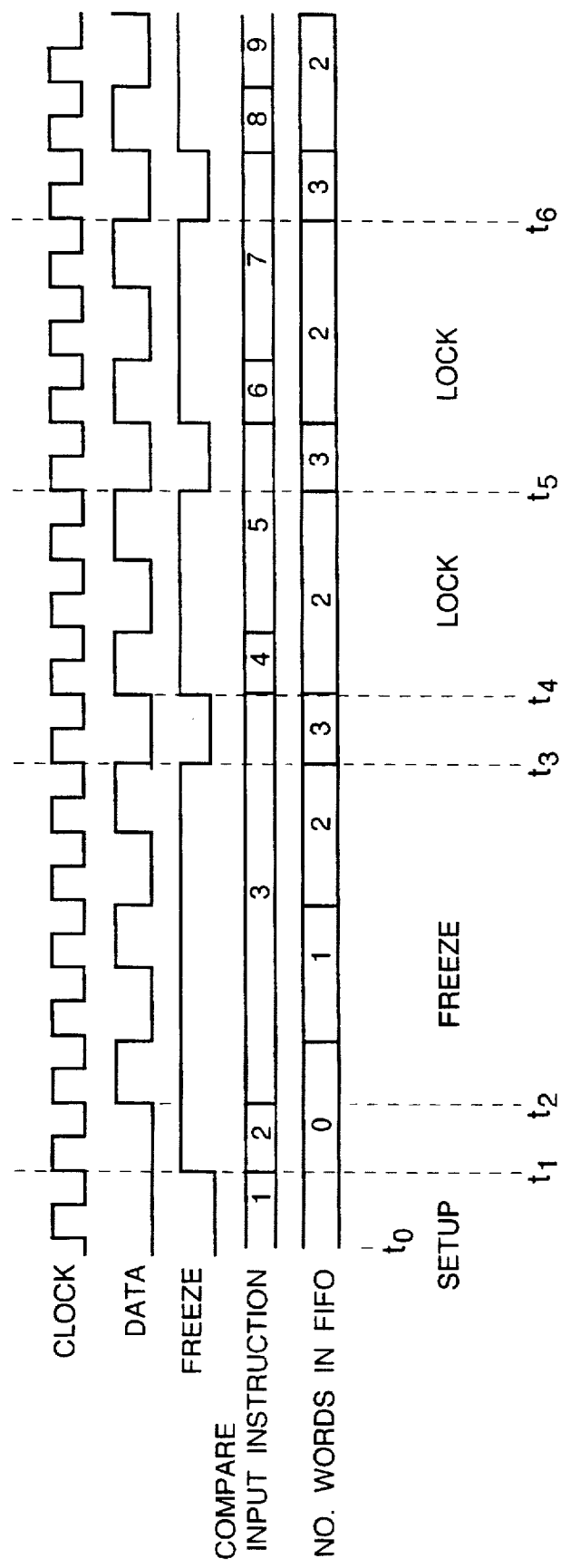
FIG. 2 is a timing diagram which illustrates the operation of the present invention.

FIG. 2 is a timing diagram which illustrates the operation of the present invention. From time $t_0$ to $t_1$, the system is in 'setup' mode. In setup, the freeze on instruction flow provided by the 'almost empty' signal is turned off. The FIFO memory 16 is cleared and the interfaces are set up.

At time $t_1$, the source of data (not shown) is turned on and the freeze on 'almost empty' is turned on. Since the FIFO memory 16 has no data, the freeze on instruction flow from the instruction memory 14 to the processor 12 via the OR gate 18 and the register 20 will take effect. In practice, this will require 'x' clocks and there will be a freeze of the processor 12 during this period.

At time $t_2$, data begins to enter the FIFO 16. The instruction stream into the computer is frozen until, at time $t_3$, enough data has entered the FIFO 16 so that the 'almost empty' signal becomes active (low). At this point, the instruction stream is unfrozen. (In practice, this would take 'y' clocks, so the FIFO 16 must be deep enough for the additional data, e.g., x+y+2.

At time $t_3$, the instruction stream is unfrozen and the processor 12 begins to take data. If the data keeps up with the instruction stream, the system continues until a mode command is provided which inhibits operation. If the data does not keep up, the FIFO 16 will empty until the 'almost empty' signal becomes active again ($t_4$). At this point, the system is again frozen until there is enough data in the FIFO to insure that the processor 12 can freeze again without a loss of data (in this case, 2 words).

In any event, those skilled in the art will appreciate that from time $t_4$ on, the processor 12 is locked to the data stream. (Note that there are two instructions for each two data words.) The lock will hold as long as the speed in which the computer matches data is equal to or greater than the input data rate.

Thus, the present invention synchronizes a data stream to an instruction steam so that for each data word, a corresponding instruction is provided in a timely manner to a processing system. The synchronization holds if the data comes in at full speed or at any slower rate without regard to when the data arrives. In the illustrative embodiment, disclosed above, the invention is implemented with a FIFO memory with an 'almost empty' indicator and a processing unit in which the instruction can be frozen on the receipt of the 'almost empty' signal which can be turned on and off.

Although the invention has been described herein with reference to a particular embodiment for a particular application, those having ordinary skill in the art and access to the present teachings will recognize additional modifications, applications and embodiments within the scope thereof. For example, other techniques and apparatus may be used to effect the control of instructions from the instruction memory to the processor based on the input data flow rate and/or the condition of the data buffer without departing from the scope of the present teachings. In addition, if a processor is being used that allows for input of a signal effective to freeze the processor, then the SILO signal from the FIFO memory may be input directly to the processor as the sole mechanism for effecting the freeze of same.

It is therefore intended by the appended claims to cover any and all such applications, modifications and embodiments within the scope of the present invention.

Accordingly,

What is claimed is:

1. A system for synchronizing data to instructions comprising:

a processor;

an instruction memory;

a first-in, first out memory having a first terminal for outputting data and a second terminal for outputting an 'almost empty' signal; and fourth means, responsive to said first-in, first-out memory, for synchronizing the input of instructions from said instruction memory to said processor based on the rate of flow of data into said first-in, first-out memory, said fourth means including:

an OR gate having a first input terminal connected to said second terminal of said FIFO memory, a second input terminal connected to a source of a clock signal and an output terminal and a register having a first input terminal connected to said instruction memory, an output terminal connected to said processor and a clock input terminal connected to the output terminal of said OR gate.

2. A system for synchronizing data to instructions comprising:

a computer for processing data;

an instruction memory for providing instructions to said computer;

first-in, first-out (FIFO) memory for providing data to said computer, wherein said FIFO memory provides output data at a first output terminal and an 'almost empty' output signal at a second output terminal thereof; and means responsive to said FIFO memory, for synchronizing the input of instructions from said instruction memory to said computer based upon the rate of flow of data into said FIFO memory, wherein said means includes an OR gate having a first input terminal connected to said second terminal of said FIFO memory, and second input terminal connected to a source of a clock signal, and an output terminal.

3. The invention of claim 2 wherein said fourth means includes a register having a first input terminal connected to said second means, an output terminal connected to said first means and a clock input terminal connected to the output terminal of said OR gate.

* * * * *